United States Patent Office 3,270,050
Patented August 30, 1966

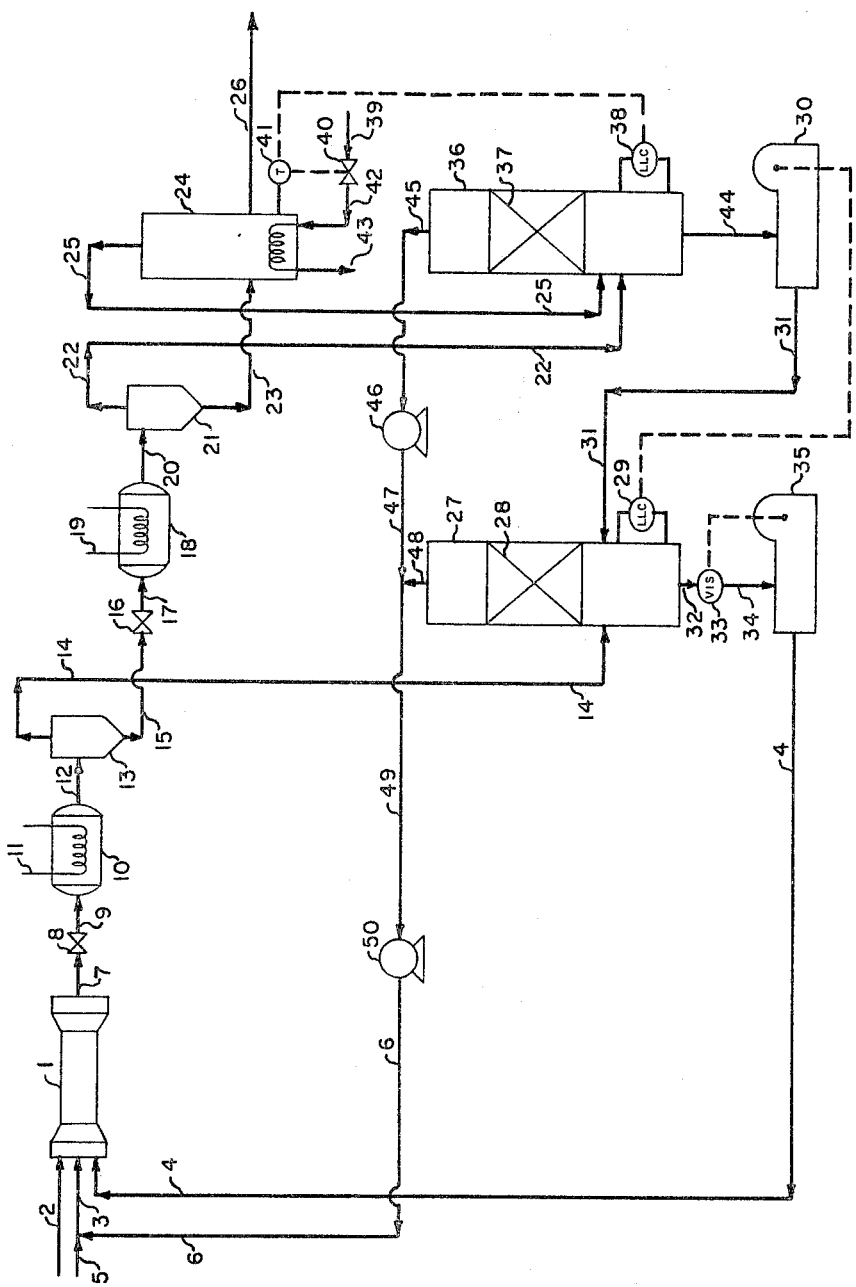

3,270,050
COMPLETE RECYCLE UREA SYNTHESIS PROCESS
Ivo Mavrovic, New York, N.Y., assignor to Chemical Construction Corporation, New York, N.Y., a corporation of Delaware
Filed July 24, 1962, Ser. No. 211,961
6 Claims. (Cl. 260—555)

This invention relates to urea synthesis, and more particularly to the maintenance of process equilibrium and internal water balance in a complete recycle urea synthesis process. It has been determined that a unique relationship exists between the rate of recycle of ammonium carbamate and the resultant strength of the ammonium carbamate solution at process equilibrium. This unique relationship, whereby a change in recycle rate is utilized to maintain the strength of the recycling solution constant regardless of process variations and without modifying net urea production, is employed as a means of process control in a unique manner.

The control of process operating conditions and solution strengths in a complete recycle urea synthesis process presents unique problems, since a change in one process variable will tend to upset the entire system. It has been especially difficult to control the water balance and the strength of recycling aqueous solutions, because inventories of aqueous ammonium carbamate solution are maintained at several points in the system. Thus, a process upset will produce sudden changes in certain solution concentrations while not affecting others to any appreciable extent. Control of the system to prevent hunting or cycling of process variables has consequently been an operating problem of serious magnitude. In most instances of prior art practice, variable amounts of external water must be constantly added to the system to prevent freeze-ups due to formation of ammonium carbamate crystals, which readily takes place when the solution strength goes above the saturation point due to process upsets.

In the present invention, the rate of recycle of aqueous ammonium carbamate solution to the urea synthesis autoclave is employed as a dependent process variable, to control the strength of the ammonium carbamate solution and to maintain process equilibrium in the system. It has been found that by employing the recycle rate as a dependent control variable, the system will automatically seek and maintain process equilibrium regardless of any process upsets. Thus, in its broadest scope, the present invention contemplates the selection of a specific desired concentration of recycling ammonium carbamate solution. A corresponding rate of solution recycle is thus established at process equilibrium. Process fluctuations or changes will be reflected in the concentration of the aqueous recycle solution. This in turn will alter the rate of solution recycle so as to again attain process equilibrium and constant solution concentration at a new rate of solution recycle. An increase in solution concentration will cause an increase in recycle rate, whereby the concentration is reduced to the desired equilibrium value. Opposite considerations will apply with respect to a decrease in solution concentration.

In a narrower embodiment, the present invention also involves control of the internal water balance and product composition in a total recycle urea process. This control is attained by maintenance of aqueous ammonium carbamate solution in an off-gas absorber at a constant level. This solution is withdrawn for recycle to urea synthesis at a rate which is essentially variable, serving to maintain constant solution concentration. The solution is maintained at a constant level in a novel manner. To maintain water balance in a complete recycle process, the liquid stream comprising aqueous urea solution free of ammonium carbamate is heated to remove excess water as steam. This steam is recycled to an off-gas absorber where it is condensed. In the present invention, the rate of steam generation and subsequent condensation is regulated in response to change in the level of ammonium carbamate solution in the off-gas absorber. Thus, an increase in this level will cause a decrease in steam generation and vice versa, and the solution level is maintained constant. It has been determined that this control sequence, when combined with the maintenance of constant ammonium carbamate solution concentration by modification of recycle rate, will result in accurate control of a complete recycle urea synthesis process, with production of aqueous urea solution at constant rate and constant equimolar composition.

The methods of regulating a complete recycle urea synthesis process outlined supra, have been found to possess several outstanding advantages over the prior art practice. The usual practice of adding process water at certain points in the system to prevent solution freeze-ups is now eliminated. This results in less ultimate dilution of process streams, and lower steam requirements for evaporation of the product aqueous urea solution. These regulation methods are also highly advantageous because hunting or cycling of process variables and stream flow rates is prevented. In addition, freeze-ups due to concentration increase are prevented. Finally, variations in process feed streams and operating conditions do not affect the process equilibrium because compensation automatically takes place due to modification of ammonium carbamate recycle rate.

It is an object of the present invention to provide an improved control system for complete recycle urea synthesis processes.

Another object is to provide a control system which automatically compensates for changes in process variables.

A further object is to provide a control system which maintains process stream concentrations at desired points regardless of process upsets.

An additional object is to provide a control system which automatically maintains process water balance through level control.

Still another object is to provide a control system which maintains a constant concentration of the recycling aqueous ammonium carbamate solution by altering recycle rate in response to changes in process variables.

These and other objects and advantages of the present invention will become evident from the description which follows. Referring to the figure, a preferred embodiment of the present invention as applied to two-stage carbamate decomposition is presented. Urea synthesis autoclave 1 receives carbon dioxide feed stream 2, ammonia stream 3 and recycle aqueous ammonium carbamate solution 4. Ammonia stream 3 is composed of ammonia feed stream 5 together with recycle ammonia stream 6. The net feed streams 5 and 2 are passed to the autoclave 1 in a 2:1 molar feed rate, which is the stoichiometric requirement for urea synthesis. A pressure level preferably in the range of 2000 p.s.i.g. to 6000 p.s.i.g. is maintained in autoclave 1, and a portion of the feed streams reacts to form urea. The resulting autoclave effluent stream 7 contains urea, ammonium carbamate, excess ammonia and water.

Stream 7 is passed through pressure reducing valve 8, whereby the pressure of the process stream is reduced to a lower lever preferably in the range of 200 p.s.i.g. to 400 p.s.i.g. The resulting stream 9 is now passed through first stage ammonium carbamate decomposer 10, which is heated by steam coils 11. Decomposition of a portion of the ammonium carbamate is thus effected, and the resulting mixed gas-liquid stream 12 is passed to separator 13. A mixed off-gas stream containing ammonia, carbon dioxide and water vapor is withdrawn from separator 13 via 14. The residual liquid stream containing urea, residual ammonium carbamate, ammonia water is withdrawn from unit 13 via 15 and passed through pressure reducing valve 16, whereby the pressure of the process stream is reduced to a lower level preferably in the range of 5 p.s.i.g. to 50 p.s.i.g. The resulting stream 17 is now passed through second stage ammonium carbamate decomposer 18, which is heated by steam coils 19. Decomposition of the balance of the ammonium carbamate is thus effected, and the resulting mixed gas-liquid stream 20 is passed to separator 21. A mixed off-gas stream containing ammonia, carbon dioxide and water vapor is withdrawn from separator 21 via 22. The residual liquid stream consisting of aqueous urea solution possibly containing slight amounts of ammonia and carbon dioxide is withdrawn from unit 21 via 23. Stream 23 is passed to degasser-evaporator 24 in which a regulated amount of water vapor is driven off, together with any residual ammonia and carbon dioxide, as vapor stream 25. The residual liquid stream, consisting of product aqueous equimolar urea solution typically containing about 77% urea, is withdrawn from unit 24 via 26, and is passed to urea finishing operations such as prilling, not shown.

Referring now to separator unit 13, the mixed off-gas stream 14 is passed to condenser-stripper 27, in which the gas stream is partially condensed in packed section 28 by contact with a recirculating stream of concentrated aqueous ammonium carbamate solution, not shown. A constant quantity of concentrated solution is maintained at the bottom section of unit 27 by means of liquid level controller 29, which changes the speed of dilute feed pump 30 in response to changes in level, and thereby changes the input rate of dilute solution feed via 31.

Concentrated aqueous ammonium carbamate solution is withdrawn from unit 27 via 32, and is recycled to urea synthesis. Stream 32 will preferably consist of an aqueous solution having a water content in the range of 20% to 35% by weight. A major aspect of the present invention involves the regulation of the flow rate of stream 32. Any process upsets or fluctuations, such as a change in the autoclave operating temperature, will tend to change the concentration of stream 32. It has been found that the concentration of stream 32 may be maintained constant as a control point regardless of such fluctuations, by modifying the flow rate of stream 32. It has been determined that maintenance of stream 32 at a constant concentration by modifying the flow rate, will automatictlly compensate for any process fluctuations and will chieve process equilibrium in a complete recycle process regardless of the changes in operating conditions. Any tendency for an increase in the concentration of stream 32 is compensated and prevented by an increase in the flow rate of stream 32, and vice versa. The concentration of stream 32 may be measured by any suitable means, however, in this preferred embodiment of the present invention, concentration is measured as a function of viscosity. Thus, stram 32 is passed through viscosity meter 33. The process stream leaves via 34, and passes to pump 35 wherein the stream is pressurized to urea synthesis pressure. The recycle stream leaves pump 35 via 4 and passes to urea synthesis. Any increase in stream concentration will be detected by meter 33, as an increase in viscosity, which in turn will increase the speed of pump 35 so as to return the viscosity of the solution to the desired point, at a higher recycle rate. Opposite considerations apply in the case of a decrease in stream concentration.

Referring now to separator unit 21, the mixed off-gas stream 22 is passed to condenser-stripper 36, in which the gas stream is partially condensed in packed section 37 by contact with a recirculating stream of dilute aqueous ammonium carbamate solution, not shown. The operation of condenser-stripper 36 and 27, as well as the general process of urea synthesis and ammonium carbamate decomposition, are described in detail in U.S. patent application Serial No. 5,379, filed January 29, 1960, now U.S. Patent No. 3,155,722.

In addition to stream 22, mixed vapor stream 25 mostly consisting of steam is also passed into unit 36, and is essentially totally condensed to liquid water. A constant quantity of dilute solution is maintained at the bottom section of unit 36 by means of liquid level controller 38, which modifies the flow rate of stream 25 in response to changes in level. This control is attained by altering the temperature of the boiling solution in unit 24. Input heating steam is passed via 39 through control valve 40, which is regulated by temperature controller 41 which in turn is set by liquid lever controller 38. Thus, the rate of steam fed via 42 to the steam coils in the bottom of unit 24 is regulated to control the rate at which vapor is generated and removed via 25. Steam condensate is removed from the steam coils via 43. As mentioned supra, stream 25 is essentially completely condensed in unit 36. Thus, effective control of the liquid level in the bottom of unit 36 is attained by regulating the flow rate of stream 25. A stream of dilute aqueous ammonium carbamate solution is withdrawn from unit 36 via 44, and is passed by pump 30 and line 31 to unit 27. As mentioned supra, this stream 44 will be withdrawn at a variable rate depending on liquid level changes in unit 27.

The system of liquid level controls described supra forms an important and novel aspect of the present invention. By relating liquid level control to input streams rather than output, and ultimately by making the operation of degasser-evaporator unit 24 dependent upon maintenance of constant liquid levels within the system, it has been determined that the overall system is self-regulating and will automatically control the concentration of the product urea solution 26. In other words, a stoichiometric balance is automatically maintained in the system, with the rate of urea production via 26 being equimolar to the rate of carbon dioxide input via 2.

Referring to unit 36, a stream of pure ammonia is withdrawn via 45 at a pressure in the range of 5 p.s.i.g. to 50 p.s.i.g This stream is compressed in compressor unit 46 to a pressure in the range of 200 p.s.i.g. to 400 p.s.i.g. and discharged via 47. A stream of pure ammonia is also withdrawn from unit 27 via 48 at a pressure in the range of 200 p.s.i.g. to 400 p.s.i.g. Streams 47 and 48 are combined to form recycle ammonia stream 49 which is compressed in unit 50 to urea synthesis pressure in the range of 2000 p.s.i.g. to 6000 p.s.i.g. and recycled via 6 to urea synthesis.

It will be understood that the concepts of the present invention are not limited to a two-stage carbamate decomposition and recycle system as described supra. Thus, the concept of modifying carbamate recycle rate to accommodate for process fluctuations while maintaining recycle carbamate solution concentration at a constant level, is applicable to any complete recycle urea synthesis process.

An example of the industrial operation of the control method of the present invention will now be described.

*Example*

An industrial urea synthesis facility was designed for operation in accordance with the present invention. The plant was in initial equilibrium with a reactor operating temperature of 380° F. A change in reactor cooling rate resulted in a decrease in reactor operating temperature to 356° F. Following this temperature change, fluctuations took place in the various internal process streams, with the facility attaining a new equilibrium process balance. Under the new equilibrium conditions, the concentration of recycling aqueous ammonium carbamate solution was unchanged, however, the recycle rate was higher. It is important to note that reaction equilibrium was attained in the synthesis autoclave under both sets of operating conditions. Following is a data table showing pertinent operating conditions.

| Operating Variable | Magnitude of Operating Variable | | |
|---|---|---|---|
| | Initial Equilibrium | Transient Change | Final Equilibrium |
| Reactor Temperature, ° F | 380 | 356 | 356 |
| Reactor Pressure, p.s.i.g | 3,200 | 3,200 | 3,200 |
| Carbon Dioxide Input, mols/hr | 100 | 100 | 100 |
| Total Ammonia Input, mols/hr | 465 | 465 | 465 |
| Recycle Carbamate Input: | | | |
| Total Rate, lbs./hr | 6,215 | 7,484 | 8,005 |
| Water Content, wt. percent | 25.0 | 25.0 | 25.0 |
| Reactor Effluent: | | | |
| Total Rate, mols/hr | 744 | 803 | 824 |
| Urea Content, mols/hr | 100 | 98.2 | 100 |
| Final Product: | | | |
| Urea Content, mols/hr | 100 | 98.2 | 100 |
| Water Content, mols/hr | 100 | 95.0 | 100 |

Thus, the plant automatically established a new equilibrium, with constant composition of the recycle carbamate solution at 25% water content but increased recycle rate. Urea output dropped slightly, but then was reestablished at 100 mols./hr. It is important to note that the reactor effluent showed a substantial increase in total rate due to increase in carbamate recycle, however, the conversion dropped because total urea output remained substantially constant. This is most important, since it demonstrates that the carbamate flow rate does not affect the overall production rate in a complete recycle process, provided that equilibrium is attained in the urea synthesis autoclave.

What I claim is:

1. In a complete recycle urea synthesis process wherein ammonia, carbon dioxide and recycled ammonium carbamate solution are reacted at elevated pressure in an autoclave, unconverted ammonium carbamate in the autoclave effluent stream is decomposed to generate first and second off-gas streams at first and second successively lower pressure levels, said off-gas streams containing ammonia, carbon dioxide and water vapor, the residual liquid stream comprising aqueous urea solution is heated to remove excess water as generated steam, the first off-gas stream is passed to a first absorber, the second off-gas stream and said generated steam are passed to a second absorber, said absorbers serving to partially condense said gaseous streams by contact with circulating aqueous ammonium carbamate solution whereby streams of pure ammonia gas are withdrawn overhead from said absorbers and recycled to urea synthesis, excess concentrated aqueous ammonium carbamate solution is withdrawn as first absorber bottoms and recycled to urea synthesis, and excess dilute aqueous ammonium carbamate solution is withdrawn as second absorber bottoms and passed to said first absorber, a method for maintaining constant stiochiometric urea production rate and process water balance comprising maintaining the concentrated aqueous ammonium carbamate solution in said first absorber at a constant level by regulating the rate of withdrawal of second absorber bottoms in response to change in said level, maintaining the dilute aqueous ammonium carbamate solution in said second absorber at a constant level by regulating the rate of steam generation in response to change in said level, and maintaining the concentrated aqueous ammonium carbamate solution at a substantially constant concentration by modifying the rate of recycle of first absorber bottoms to urea synthesis as a direct function of process variation in bottoms solution concentration.

2. Method of claim 1, in which said modification of the first absorber bottoms recycle rate as a function of process variation in bottoms solution concentration is obtained by modifying the rate of the solution recycle as a direct function of change in the viscosity of the bottoms solution.

3. In a complete recycle urea synthesis process wherein ammonia, carbon dioxide and recycled ammonium carbamate solution are reacted in an autoclave at a pressure in the range of 2000 p.s.i.g. to 6000 p.s.i.g., part of the unconverted ammonium carbamate in the autoclave effluent stream is decomposed at a pressure in the range of 200 p.s.i.g. to 400 p.s.i.g. to generate a first off-gas stream, the balance of the ammonium carbamate in the autoclave effluent stream is decomposed at a pressure in the range of 5 p.s.i.g. to 50 p.s.i.g. to generate a second off-gas stream, said off-gas streams containing ammonia, carbon dioxide and water vapor, the residual liquid stream comprising aqueous urea solution is heated to remove excess water as generated steam whereby a product stream containing about 77% urea is produced, the first off-gas stream is passed to a first absorber, the second off-gas stream and said generated steam are passed to a second absorber, said absorbers serving to partially condense said gaseous streams by contact with circulating aqueous ammonium carbamate solution whereby streams of pure ammonia gas are withdrawn overhead from said absorbers and recycled to urea synthesis, excess concentrated aqueous ammonium carbamate solution having a water content in the range of 20% to 35% by weight is withdrawn as first absorber bottoms and recycled to urea synthesis, and excess dilute aqueous ammonium carbamate solution is withdrawn as second absorber bottoms and passed to said first absorber, a method for maintaining constant stoichiometric urea production rate and process water balance comprising maintaining the concentrated aqueous ammonium carbamate solution in said first absorber at a constant level by regulating the rate of withdrawal of second absorber bottoms in response to change in said level, maintaining the dilute aqueous ammonium carbamate solution in said second absorber at a constant level by regulating the rate of steam generation in response to change in said level, and maintaining the concentrated aqueous ammonium carbamate solution at a substantially constant concentration by modifying the rate of recycle of first absorber bottoms to urea synthesis as a direct function of variation in bottoms solution concentration.

4. Method of claim 3, in which said modification of the first absorber bottoms recycle rate as a function of process variation in bottoms solution concentration is obtained by modifying the rate of the solution recycle as a direct function of change in the viscosity of the solution.

5. In a complete recycle urea synthesis process wherein ammonia, carbon dioxide and recycled ammonium carbamate solution are reacted at elevated pressure in an autoclave, unconverted ammonium carbamate in the autoclave effluent stream is decomposed to generate off-gas streams at first and second successively lower pressure levels, said off-gas streams containing ammonia, carbon dioxide and water vapor, the first off-gas stream is passed to a first absorber, the second off-gas stream is passed to a second absorber, said absorbers serving to partially condense said gaseous streams by contact with circulating aqueous ammonium carbamate solution whereby streams of pure ammonia gas are withdrawn overhead from said absorbers and recycled to urea synthesis, excess concentrated aqueous ammonium carbamate solution is withdrawn as first absorber buttoms and recycled to urea synthesis, and excess dilute aqueous ammonium carbamate solution is withdrawn as second absorber bottoms and passed to said first absorber, a method for maintaining constant stoichiometric urea production rate and process equilibrium comprising maintaining the concentrated aqueous ammonum carbamate solution in said first absorber at a constant level by regulating the rate of withdrawal of second absorber bottoms in response to change in said level, and maintaining the concentrated aqueous ammonium carbamate solution at a substantially constant concentration by modifying the rate of recycle of first absorber bottoms to urea synthesis as a direct function of process variation concentration.

6. Method of claim 5, in which said modification of the first absorber bottoms recycle rate as a function of process variation in bottoms solution concentration is obtained by modifying the rate of solution recycle as a direct function of change in the viscosity of the bottoms solution.

References Cited by the Examiner

UNITED STATES PATENTS 2,848,493  8/1958  Dewling et al. _____ 260—555
3,155,722  11/1964  Mavrovic _____ 260—555

FOREIGN PATENTS 535,406  1/1957  Canada.

ALEX MAZEL, *Primary Examiner.*

NICHOLAS S. RIZZO, *Examiner.*

H. R. JILES, *Assistant Examiner.*